United States Patent [19]

Michael

[11] Patent Number: 5,717,544
[45] Date of Patent: Feb. 10, 1998

[54] PRESSURE DIFFERENTIAL LATCH FOR A DISK DRIVE

[75] Inventor: Albert David Michael, Hudson, Mass.

[73] Assignee: Quantum Corporation, Milpitas, Calif.

[21] Appl. No.: 557,584

[22] Filed: Nov. 14, 1995

[51] Int. Cl.⁶ .................... G11B 5/48; G11B 21/16
[52] U.S. Cl. .................. 360/104; 360/105; 360/137
[58] Field of Search .......................... 360/104, 105, 360/106, 97.02, 109, 137

[56] References Cited

U.S. PATENT DOCUMENTS

| | | | |
|---|---|---|---|
| 4,538,193 | 8/1985 | Dimmick et al. | 360/137 |
| 4,647,997 | 3/1987 | Westwood | 360/105 |
| 4,692,829 | 9/1987 | Campbell | 360/105 |
| 5,036,416 | 7/1991 | Mastache | 360/105 |
| 5,208,713 | 5/1993 | Lindsay et al. | 360/105 |
| 5,274,519 | 12/1993 | Saito et al. | 360/105 |
| 5,319,511 | 6/1994 | Lin | 360/105 |
| 5,341,259 | 8/1994 | Amirkiai et al. | 360/105 |
| 5,404,257 | 4/1995 | Alt | 360/105 |
| 5,452,161 | 9/1995 | Williams | 360/105 |
| 5,526,203 | 6/1996 | Mohajerani et al. | 360/97.02 |

Primary Examiner—Robert S. Tupper
Assistant Examiner—Adriana Giordana
Attorney, Agent, or Firm—David B. Harrison; Debra A. Chun

[57] ABSTRACT

A pressure differential actuator latching apparatus for a disk drive device is provided. The latching apparatus includes a rotatable body portion, a rigid air vane portion and a latching trap. When a data storage disk of the disk drive is not being rotated, the latching apparatus maintains a transducer actuator assembly of the disk drive in a locked position by engaging the transducer actuator assembly in the latching trap. When the data storage disk is rotated, airflow is generated proximate to the surface of the disk, in the same direction in which the disk is rotated. The transducer actuator assembly, positioned over the surface of the disk, blocks the airflow. The blockage of airflow creates an area of low pressure just downstream of the actuator assembly. The latching apparatus is disposed in a space between the edge of the data storage disk and walls of the housing so that the air vane portion is positioned between the areas of low and ambient pressure. The pressure difference integrated over the surface of the air vane portion exerts a force on the air vane portion at a distance from a pivot, rotating the latching apparatus towards the edge of the disk to release the actuator assembly from the latching trap. Once disk rotation stops, the air vane portion returns to its original position and the latching trap engages the actuator assembly in the locked position.

14 Claims, 5 Drawing Sheets

PRESSURE DIFFERENTIAL LATCH FOR A DISK DRIVE

FIELD OF THE INVENTION

The present invention relates to an apparatus and method for releasably locking an transducer actuator assembly at a fixed position relative to a disk. More particularly, the present invention is related to an improved apparatus and method for releasably locking an actuator assembly using a rigid air vane positioned between high and low pressure zones existing in a spinning disk drive due to the transducer actuator assembly diverting airflow of the spinning disk. The rigid air vane can be deflected to an unlock position by the pressure difference integrated over an area of the air vane.

BACKGROUND OF THE INVENTION

In conventional Winchester disk drives, a read/write head or transducer assembly "flies" upon an air bearing or cushion in very close proximity to the rotating surface of the data storage disk. The disk surface carries a thin film magnetic material having a multiplicity of magnetic storage domains that may be recorded and read back by the head. The transducer assembly, which can be any conventional, well-known combination of transducers, sliders and load beams, is positioned and supported proximate the surface of the data storage disk using an actuator. The combination of the transducer assembly and the actuator is commonly referred to as the transducer actuator assembly or actuator assembly. The actuator supports the load beams and sliders, and accurately positions the transducers above the surface of the disk to read and write data from/to the disk. The load beam typically applies a preload force to the slider to urge it toward the surface of the disk. This force is overcome by airflow generated during rotation, or spinning, of the disk, creating the air bearing upon which the transducer assembly flies.

The actuator typically contains a driving mechanism for positioning of the transducer assembly, and a support mechanism, or carriage assembly, for connecting the driving mechanism to the transducer assembly. Typically, the driving mechanism is either a linear or rotary actuator motor which drives the support mechanism along a predetermined path to position the transducer assembly relative to the surface of the data storage disk. Typically, the actuator motor includes a voice coil operating within a closed loop head positioning servo, and is referred to as a voice coil actuator motor.

When the data storage disk is spun or rotated, airflow is generated. The amount of airflow is known to be a function of the disk diameter and angular velocity, and the force of the airflow is greatest adjacent the peripheral edge of the rotating data storage disk. Additionally, the generated airflow produces the air cushion or bearing overcoming the preload force of the load beam, and enables the transducer assembly to fly in close proximity to the surface of the disk. When the disk rotation ceases, the air cushion dissipates, such that the transducer assembly is no longer supported above the surface of the disk. Typically, when power is removed from the spindle motor that rotates the disk, the transducers come to rest or "land" on the surface of the disk. Likewise, when spindle motor is powered up, the transducers "take off" from the surface of the disk. This landing and taking off activity can lead to loss of data at best, and failure of the disk drive at worst, due to erosion or scarring of the magnetic film on the surface of the disk. To ensure that the transducers do not come to rest upon an area of useful data storage, the actuator positions the transducers over a head landing or parking zone on the surface of the disk, as power is removed from the disk drive.

Conventionally, while the disk drive is not in operation, friction between the transducer assembly and the surface of the disk maintains the transducer actuator assembly at a fixed position in the landing zone. However, lateral shocks to the disk drive can cause the transducer assembly to move or slide radially across the surface of the disk. Such movements can cause damage to the surface of the disk, as well as damage to the sliders and transducers. Such damage can additionally result in loss of data and/or transducer malfunction which can render the disk drive inoperable.

Consequently, disk drive designers have employed a variety of actuator latching devices to maintain the transducer actuator assembly in a locked position while the disk is not rotating. When the disk has attained a proper rotational velocity to produce a sufficient air bearing to support the transducer, the latching device releases the actuator, enabling it to operate through its predetermined path of travel relative to the surface of the disk.

Generally, there are several well-known approaches to latching devices: solenoid style latches, magnetic capture latches, inertial latches, and air vane latches extending over or under the disk, or between the disks in the case of a multi-disk disk drive.

Solenoid style latches typically have a pin, rod or shaft biased into engagement with a movable portion of a transducer actuator assembly by a spring or by magnetic field attraction. When engaged, the pin immobilizes the transducer actuator assembly. A solenoid, attached to the pin, withdraws the pin from the transducer actuator assembly when the disk attains an appropriate rotational velocity to produce an air bearing or cushion. This approach requires a complex electro-mechanical latching apparatus which can add to the size, weight, cost and power consumption of the disk drive. Examples of solenoid style latches include U.S. Pat. Nos. 4,881,139; 4,903,157; and 5,095,395.

Magnetic capture latches typically have a small permanent magnet attached to a movable portion of a transducer actuator assembly, and a steel striking plate mounted at a fixed location on the housing of the disk drive. The permanent magnet and striking plate are positioned such that, when the transducers are positioned in the landing zone, the magnet attaches to the striking plate. The attractive latching force between the magnet and the striking plate mobilizes the transducer actuator assembly, latching the transducer actuator assembly in a locked position. When the disk drive is powered up, and the disk is spinning at a sufficient rotational velocity to produce an air bearing, the actuator motor overcomes the attractive latching force to move the transducer actuator assembly such that the magnet separates from the striking plate. U.S. Pat. No. 5,025,335 discloses an example of a magnetic capture latch.

A disadvantage of magnetic capture latches is that they require large actuator motors, which can add to the size, weight, cost and power consumption of the disk drive. While the magnetic capture latches are typically small in size, they require larger actuator motors than disk drives using other latching devices. This is because the actuator motor in a disk drive having a magnetic capture latch must be capable of overcoming the attractive latching force in addition to positioning the transducer. Another disadvantage of magnetic capture latches is that drives employing such latches are susceptible to damage from mechanical shocks having a force greater than the attractive latching force between the magnet and the striking plate. Additionally, a resultant magnetic field can add a deflection bias force to the actuator at the vicinity of innermost data tracks, thereby potentially interfering with, or adding complexity to, the head positioning servo loop. This bias force can be minimized by providing a shifting proximity magnetic capture latch, such as disclosed in U.S. Pat. Nos. 5,003,422 and 5,341,259.

Inertial latches, such as the one exemplified by U.S. Pat. No. 5,404,257, typically include a biased inertial body capable of engaging a finger, or the like, on an actuator assembly. The inertial body is biased to an unlocked position when the computer is not being subjected to rotational forces, but in the presence of rotational shock forces, its moment of inertia overcomes the biasing force to latch the actuator assembly. A problem with such inertial latches is that they may prove to be unreliable in response to such rotational shock forces.

The fourth type of known latching device, the air vane latch, typically includes an air vane latch mechanism that releasably engages a movable portion of the transducer actuator assembly when the disk is not being rotated. The conventional air vane latches include an air vane attached to or extending from the latch mechanism. The air vane is positioned to extend over the disk or between the disks of the disk drive, in close proximity to the surface of the disk(s). Such air vanes use kinetic energy of the generated airflow moving with the disk to move the air vane, overcoming a biasing force and causing the latch mechanism to release the transducer actuator assembly. Examples of such air vane latches are described in commonly assigned U.S. Pat. Nos. 4,538,193; 4,647,997; 4,692,829; 5,319,511; and 5,452,161.

However, the conventional air vane latching devices have several disadvantages. For example, such placement of the air vane proximate to the surface of the disk impedes the airflow thereby requiring additional airflow generators and increased power for generating airflow sufficient to produce a force necessary to overcome the biasing force. Additionally, the air vanes require an appropriate surface area for the airflow to move or deflect the air vane and cause release of the latch mechanism. Such surface area can require increased spacing between disks of a multi-disk drive and/or increased spacing between the surface of the disk and the housing enclosing the disk drive assembly. This increased spacing increases the size and cost of manufacturing the disk drives.

Thus, there exists a need for an improved, simple and cost efficient latching apparatus which can effectively use the airflow generated by a spinning disk and which does not require increased power use, nor increased size of the disk drive assembly.

SUMMARY OF THE INVENTION

The latching apparatus of the present invention satisfies these needs.

A general object of the present invention is to provide a latching apparatus for a transducer actuator assembly of a disk drive assembly which overcomes the limitations and drawbacks of the prior art latching devices.

A more specific object of the present invention is to provide a latching apparatus utilizing a single rigid air vane positioned away from the rotating data storage disks, which is deflected to release a transducer actuator assembly by diverted airflow within a disk drive assembly.

A further specific object of the present invention is to provide a latching apparatus which positions a single rigid air vane between high and low pressure zones existing within a spinning disk drive assembly, to use the pressure difference for releasing a transducer actuator assembly from a locked state.

Another object of the present invention is to provide a latching apparatus including a single rigid air vane, positioned away from the rotating data storage disk, responsive to airflow generated by the rotating data storage disk to deflect the air vane causing release of a transducer actuator assembly from a locked state.

The latching apparatus is employed in a disk drive assembly contained within a housing including a base and integral sidewalls together defining an interior space. The disk drive typically includes a spindle motor fixedly attached to the housing, and which forms a spindle hub for at least one rotatable data storage disk. A voice coil actuator structure having either a linear or rotary-type actuator motor, is secured to the housing and positioned so that its movable support or carriage arm holding a transducer assembly extends over the surface of the data storage disk. The latching apparatus comprises a shaft fixedly attached to the base of the housing a predetermined distance from an edge of the data storage disk, and a latch member rotatably disposed on the shaft to have an axis of rotation about the shaft. The latch member includes a body portion disposed on the shaft, a rigid air vane portion extending radially from the body portion, and a latching trap extending from the body portion opposite the air vane portion. The rigid air vane portion has a surface oriented generally orthogonal to the surface of the disk, and extends radially from the body portion to within a predetermined distance from a sidewall of the housing. The air vane portion is disposed, away from the edge of the disk, between high and low pressure zones defined by the rotating disk, the transducer actuator assembly and the sidewalls of the housing. The air vane portion is deflected by the difference between the high and low pressure zones integrated over its surface, to rotate the latch member between a locked and unlocked position. The latching trap extends from a lower region of the body portion and is positioned to extend in a direction opposite to that of the air vane portion. When the latch member is in the locked position, the latching trap engages the transducer actuator assembly in a locked state to maintain the transducer assembly at a head landing or parking zone when the disk is not being rotated.

The latch apparatus additionally includes a bias mechanism disposed between the shaft and the body portion of the latch member for biasing the latch member to the locked position in the absence of airflow. Preferably the bias mechanism is a spring mechanism. Preferably the latch member is formed of a liquid crystal polymeric material. Preferably the latching trap defines a notch which is integrally formed with the body portion of the latch member. The latch apparatus further includes a stop fixedly attached to the base of the housing for preventing the air vane portion of the latch member from rotating into contact with the disk. The latch apparatus can further include an airflow blocking member positioned proximate to the surface of the rotating data storage disk for blocking the airflow generated incident to the rotation of the disk and for creating the low pressure zone downstream from the airflow blocking member.

In operation, power is applied to the disk drive, enabling the spindle motor to rotate the data storage disk. Rotation of the data storage disk generates airflow in the direction of disk rotation, proximate to the surface of the disk. The transducer actuator assembly which is positioned over the surface of the disk blocks the airflow generated incident to the rotation of the disk. Alternatively, an airflow blocking member can be positioned over the surface of the disk to block the airflow. The airflow is diverted away from the disk and around the back of the transducer actuator assembly, or airflow blocking member. The blocked airflow creams a low pressure zone just down stream from the transducer actuator assembly, and a high pressure zone in a corner of the housing containing a bulkhead connector. The latch apparatus is disposed between the low and high pressure zones such that the pressure difference exerts a force against the air vane portion of the latch member, rotating the latch member to the unlocked position which releases the transducer actuator assembly from the latching trap. The carriage arm of the transducer actuator assembly is then free to move relative to the surface of the disk to position the transducer assembly for reading or writing data from/to the disk. When disk rotation ceases, the airflow consequently ceases such that the force exerted against the air vane portion of the latch member is eliminated. In the absence of the force, the latch member is biased to return to the locked position, and catches the transducer actuator assembly in the latching trap to secure the transducer actuator assembly in a locked state.

BRIEF DESCRIPTION OF THE DRAWINGS

These and other objects, advantages and features of the present invention will be better understood and appreciated upon consideration of the following detailed description, appended claims and accompanying drawings of a preferred embodiment, where:

FIG. 4b shows a side and bottom elevational view of the latch member of FIG. 4a.

DETAILED DESCRIPTION OF A PREFERRED EMBODIMENT

Figure 1A:
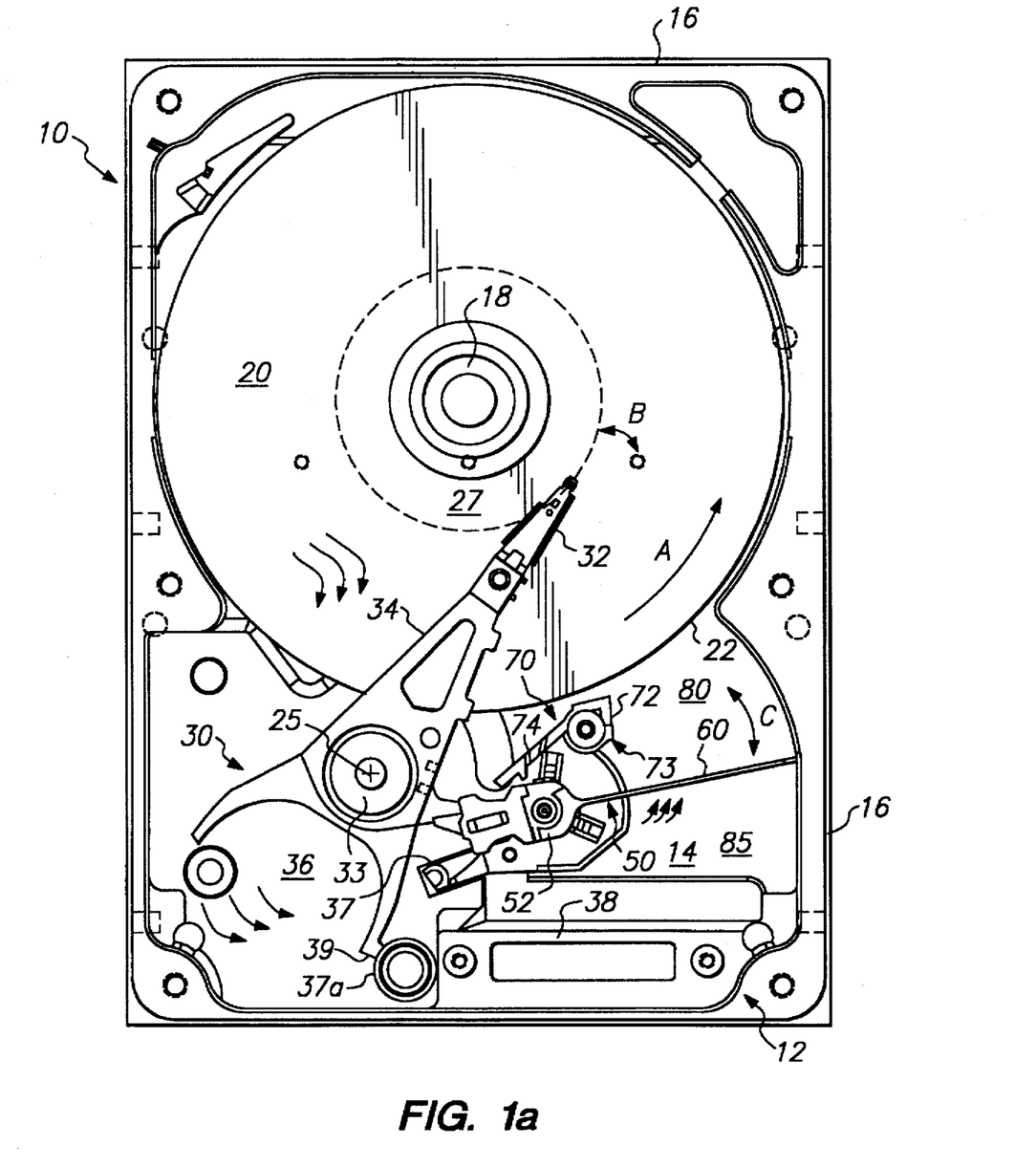
FIG. 1a shows an enlarged diagrammatic top plan view of a disk drive showing a version of the latch apparatus of the present invention in the locked position.
Figure 2A:
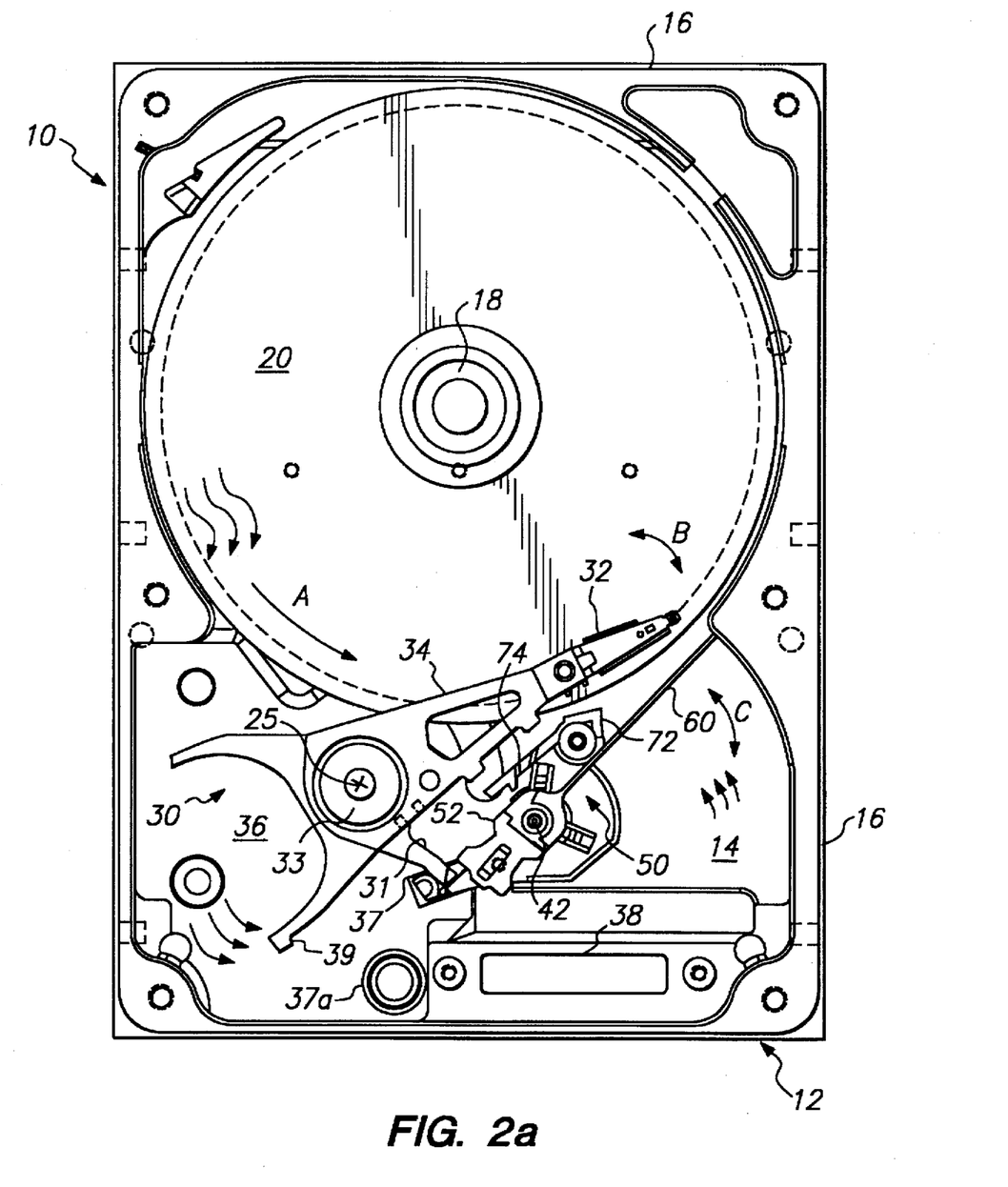
FIG. 2a shows a top plan view of a disk drive showing a version of the latch apparatus of the present invention in the unlocked position.

Referring to FIGS. 1a and 2a, a disk drive assembly 10 including an air vane latching mechanism 40 which incorporates principles of the present invention is shown. The disk drive 10 is contained within a housing 12 which includes a base 14, integrally connected sidewalls 16, and a cover (not shown). The combination of the base 14, sidewalls 16 and cover defines an interior space in which the disk drive 10 is disposed. The disk drive 10 includes a spindle or hub 18 having an axis of rotation, a data storage disk 20 rotatably mounted to the spindle 18, and a transducer actuator assembly 30. For simplicity, the following discussion describes operation of a disk drive 10 having a single data storage disk 20. However, as those skilled in the art will recognize, the present invention is capable of true in a disk drive 10 employing a plurality of data storage disks 20 which can be commonly mounted to the spindle 18. Typically, a brushless spindle motor 24 is coupled to the spindle 18 for rotating the data storage disk 20 at a predetermined angular velocity. The spindle motor 24 is typically integrated into the hub 18 that supports the data storage disk 20, such that the spindle motor 24 supports and directly rotates the storage disk 20. The data storage disk 20 is rotated in a counterclockwise direction, as indicated by arrow A, about the axis of rotation.

The data storage disk 20 can have a single surface, or both an upper and lower surface, on which data is stored. Typically, the surface of the disk 20 is coated, plated or deposited with a suitable magnetic material, such as ferrous oxides. However, the storage medium can also be optical, magneto-optical, and the like.

The transducer actuator assembly 30 is bidirectionally rotatably journalled to the base 14 of the housing 12 about an axis of rotation 25. The transducer actuator assembly 30 can rotate bidirectionally along a path of approximately 30 degrees, as indicated by the arrow B. The transducer actuator assembly 30 includes a transducer assembly 32, a carriage or support arm assembly 34, and an actuator voice coil motor 36. The transducer actuator assembly 30 can be a rotary or linear-type assembly.

The transducer assembly 32 is attached to a first end of the carriage assembly 34 in a conventional manner, and the voice coil motor 36 is attached to a second end of the carriage assembly 34 by adhesive or by intergral molding thereto. The carriage assembly 34 is mounted to the base 14 by a journal 33 about which the transducer actuator assembly 30 rotates. The journal 33 is disposed adjacent to a peripheral edge 22 of the data storage disk 20 such that the carriage 34 and transducer assemblies extend over the the surface of the disk 20. Activation of the actuator voice coil motor 36 rotates the transducer actuator assembly 30 about the journal 33 and accurately positions the transducer assembly 32 over concentric data tracks on the surface of the data storage disk 20, to allow read/write transducers (not specifically shown) access to stored data.

A conventional transducer assembly 32 includes a read/write transducer formed on an air bearing slider, and a load beam. The load beam is preloaded to bias the slider toward the surface of the disk 20 such that when the disk 20 is not rotating, the transducer rests on the surface of the disk 20. Alternatively, when the disk 20 is rotating, the slider-transducer overcomes the load beam preload force and "flies" just above the surface of the disk 20 on an air bearing or cushion in accordance with conventional Winchester disk principles. During flight, the transducer actuator assembly 30 rotates relative to the surface of the disk 20, as indicated by arrow B, to position the transducer over the necessary data tracks. When the actuator voice coil motor 36 is deactivated, the transducer assembly 32 must be positioned to a parking or landing zone 27 where they will not damage the surface of the disk 20. Typically, the landing zone 27 is an inner annular region of the disk 20 proximate to the spindle hub 18. The latching apparatus 40 of the present invention locks the transducer actuator assembly 30 as the transducer assembly 32 comes to rest in the landing zone 27.

Additionally, the disk drive 10 typically includes an actuator crash stop 37 fixedly attached to the base 14. The crash stop 37 is located in a corner of the housing 12 between the peripheral edge 22 of the data storage disk 20, the transducer actuator assembly 30 and a bulkhead connector 38. The crash stop 37 provides a stop for an extension 31 of the transducer actuator assembly 30 to limit rotational movement of the transducer actuator assembly 30 on the disk. Additionally, a second crash stop 37a can be positioned such that a rear portion 39 of the transducer actuator assembly 30 will come to rest with the second crash stop 37a to prevent the transducer assembly 32 of the actuator assembly 30 from "crashing" into the spindle hub 18, which will destroy the read/write transducers of the transducer assembly 32. The second crash stop 37a can be constructed as part of the voice coil motor 36, or as a separate piece.

Figures 3, 4A:
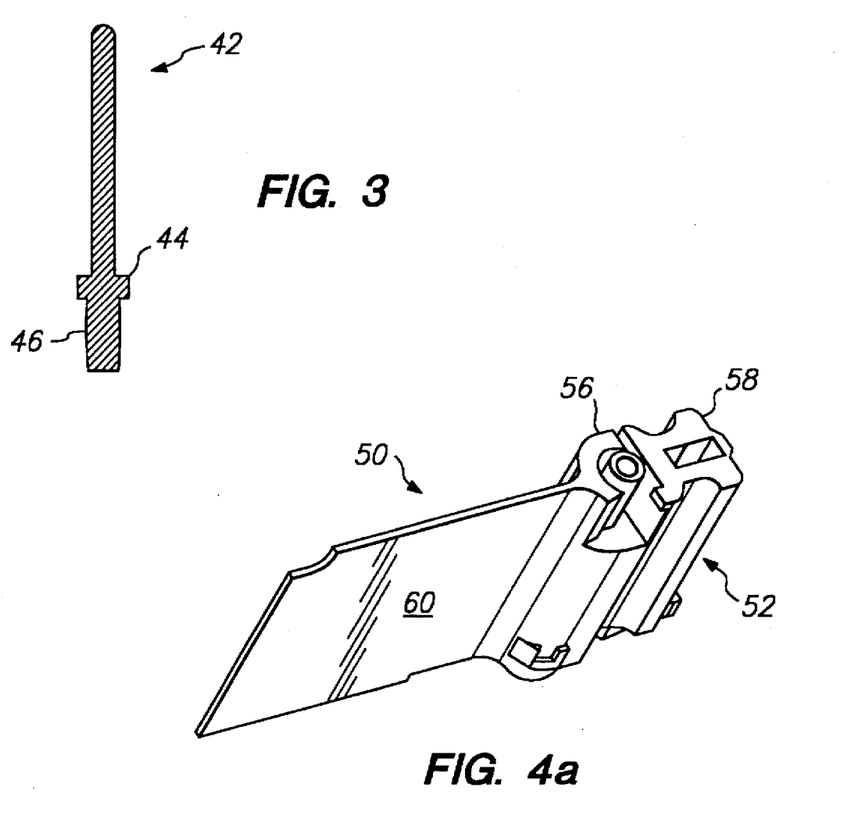
FIG. 3 shows a side elevational view of an embodiment of the shaft and bias mechanism of the present invention.
FIG. 4a shows a side and top elevational view of an embodiment of a latch member of the present invention.

The latching apparatus or mechanism 40 of the present invention generally comprises a shaft or post 42 fixed to the base 14 of the housing 12, with a latch member 50 rotatably disposed on the shaft 42. With reference to FIG. 3, the shaft 42 has a cylindrical shape and includes a ledge portion 44 extending around its periphery proximate to a lower end 46 of the shaft 42. The shaft 42 is preferably fabricated out of stainless steel, or any other suitably strong, rigid material. In the illustrated embodiment of the present invention, the shaft 42 is sized to have a vertical height of approximately about 31 mm, with the ledge portion 44 disposed approximately about 6.4 mm from the lower end 46 of the shaft 42. The lower end 46 of the shaft 42 is sized to have a diameter of about 3.0 mm.

Figure 4B:
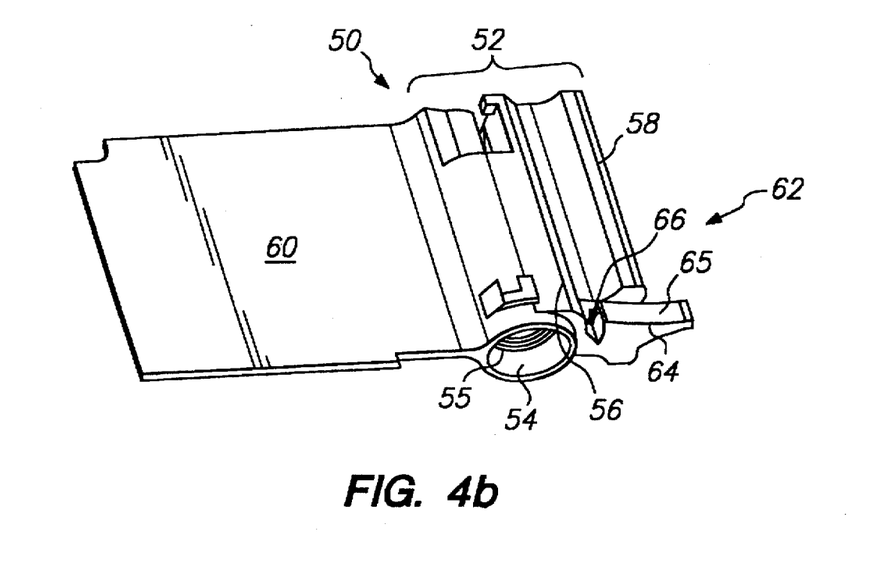

Referring to FIGS. 4a and 4b, the latch member 50 comprises a body portion 52, a rigid air vane portion 60 and a latching trap 62. The latch member 50 is preferably formed from a liquid crystal polymer, or other suitably formable rigid, low friction material. The body portion 52 of the latch member 50 has a hollow cylindrical core 54 sized to accommodate the shaft 42 so that the shaft 42 engages the latch member 50 to enable rotation of the latch member 50. Additionally, the hollow cylindrical core 54 is sized to retain a bias mechanism 55 (partially shown) therein. Preferably, the bias mechanism 55 is a spring made of stainless steel, or any other suitably strong, corrosion resistant material. The spring 55 applies a reverse bias torque of approximately 0.70 N-mm to the latch member 50 to urge the latch member 50 to its locked position when the latch member 50 is positioned on the shaft 42. The body portion 52 of the latch member 50 is disposed on the shaft 42 and is rotatable about the shaft 42 in a bidirectional manner, as indicated by arrow C in FIGS. 1a and 2a. Preferably, the latch member 50 rotates bidirectionally in a limited range of movement of about 35 degrees, as measured from the locked position.

As illustrated in FIGS. 4a and 4b, a version of the body portion 52 of the present invention includes a forward section 56 having a generally cylindrical shape and comprising the hollow core 54 in which the shaft 42 is disposed, and a rear section 58 extending from and integrally connected to the forward section 56.

In the version of the latch member 50 shown in FIGS. 4a and 4b, the air vane portion 60 of the latch member 50 comprises a rectangular shaped plate extending from the forward section 56 of the body portion 52 in a direction opposite to that which the rear section 58 extends. The vane portion 60 is shaped and sized to have a surface area upon which the airflow induced pressure differential, generated by rotation of the data storage disk 20 acts. The action of the pressure differential upon the vane portion creates a force (F=ΔpA) which acts at a distance to create a torque, (T=F·d) causing the latch member 50 to be rotated about the shaft 42. The vane portion 60 extends to within a predetermined distance of the sidewall 16 of the housing 12, to minimize diversion of airflow around the surface of the air vane portion 60. Preferably, the vane portion 60 extends to within about 0.2 to about 0.7 mm of the sidewall 16 of the housing 12. In an embodiment of the present latch apparatus 40 used in a disk drive 10 device with 3.5 inch diameter data storage disks 20, the air vane portion 60 preferably extends about 38 mm from the center of the core 54 of the body portion 52, has a vertical height of about 29 mm, and a width of about 0.63 mm.

Figure 2B:
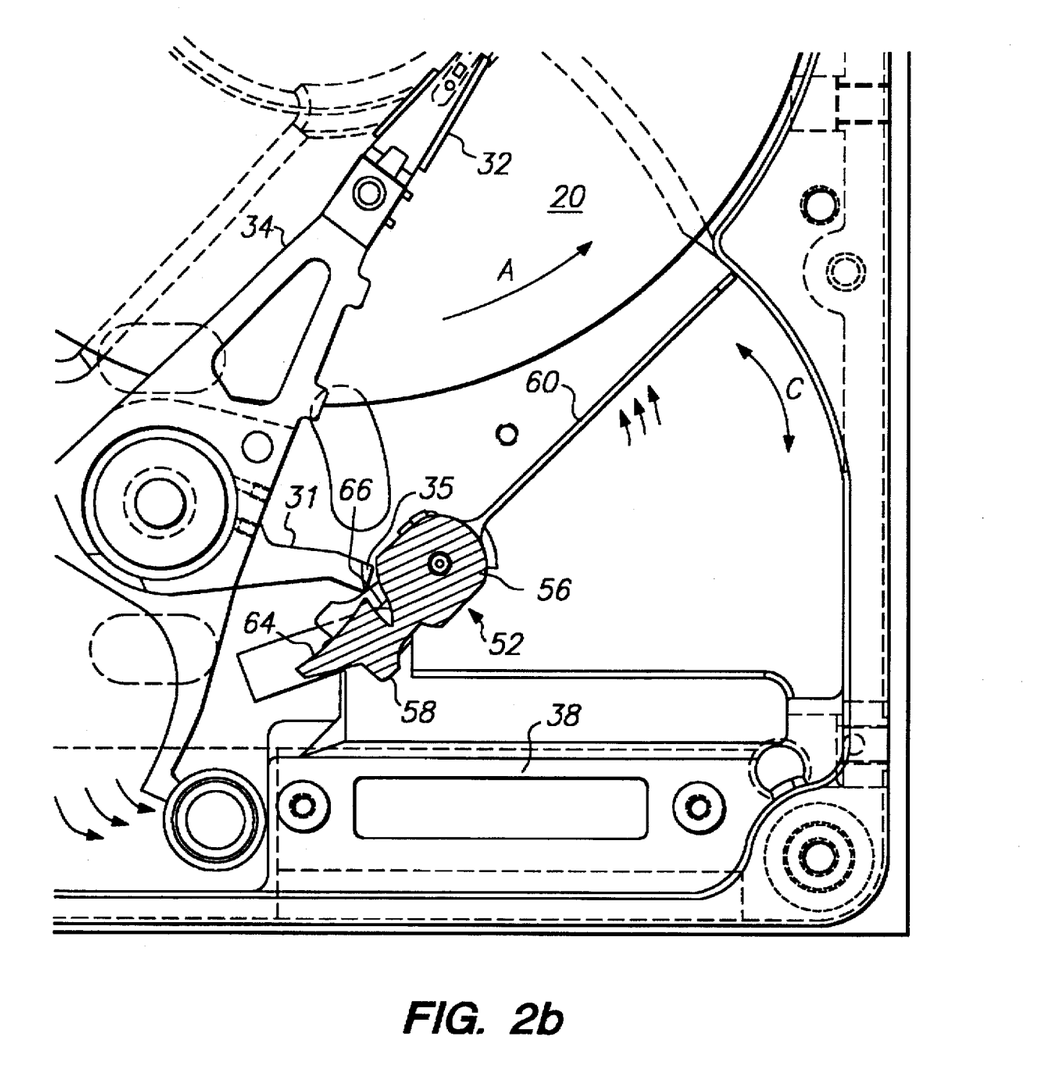
FIG. 2b shows a partial top plan view of the disk drive of FIG. 2a, showing in detail the latching trap and the latching tooth.

Referring to FIGS. 2b and 4b, the latching trap 62 is formed below the bottom of the rear section 58 of the body portion 52 of the latch member 50. The latching trap 62 comprises a tail 64 extending from the rear section 58 in a direction opposite to that of the air vane portion 60, and a notched indentation 66 defined by the tail 64 and the forward section 56 of the body portion 52. The latching trap tail 64 has a slightly arcuate face 65 against which the extension 31 of the actuator assembly 30 is positioned to guide the extension 31 into the notched indentation 66 which is capable of trapping and holding a latching tooth 35 on the extension 31 of the transducer actuator assembly 30.

The body portion 52, air vane portion 60 and latching trap 62 of the latch member 50 can be integrally formed or molded as a single unit. Alternatively, the pieces can be fabricated separately and joined in any conventional manner, such as with adhesives or screws.

Figure 1B:
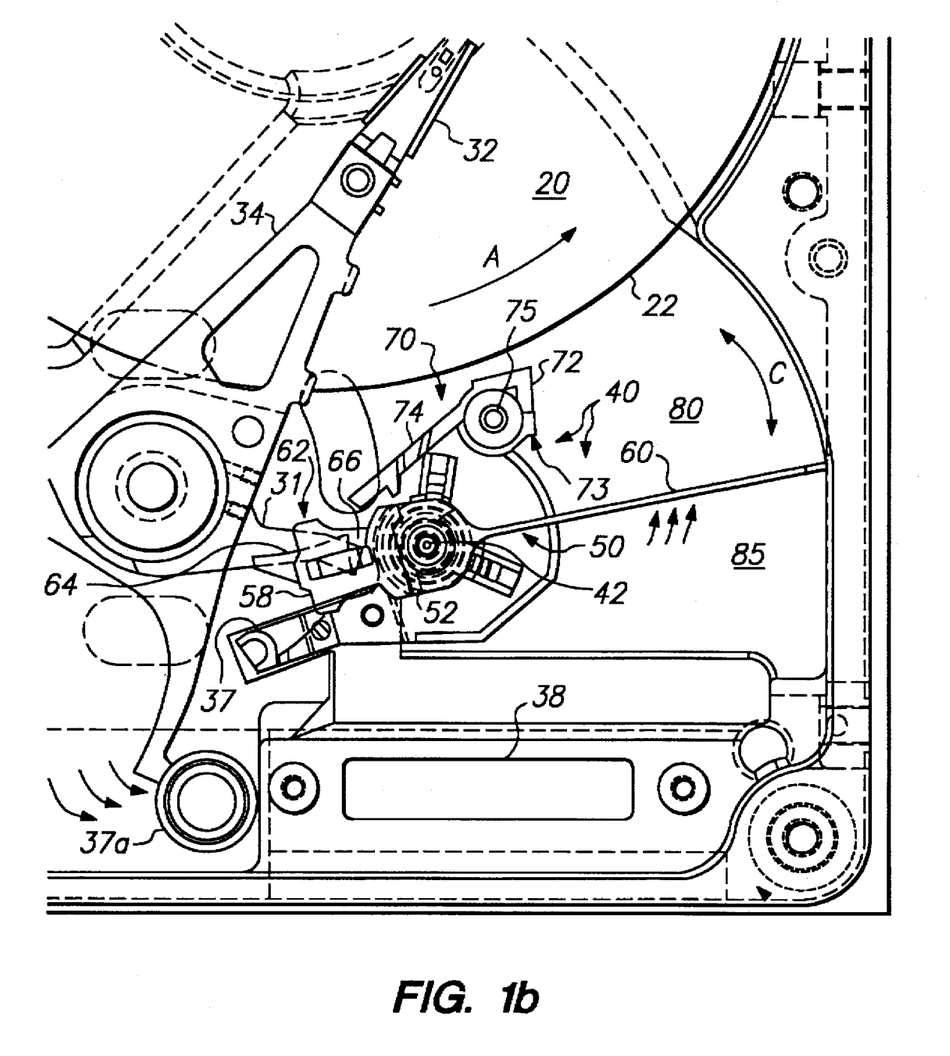
FIG. 1b shows a partial top plan view of the disk drive of FIG. 1a, showing in detail the latching tooth engaged by the latching trap.

The latch apparatus 40 of the present invention can additionally include a stop 70 as shown in FIGS. 1a, 1b and 2a. The stop 70 is fixedly attached to the base 14 by a securing pin 75, screw, or the like (shown in FIG. 1b), and disposed in a space between the peripheral edge 22 of the data storage disk 20 and the latch member 50. The stop 70 is shaped and sized to stop the deflected latch member 50 from rotating into contact with the data storage disk 10. In the illustrated version, the stop 70 comprises a main portion 72 having a vane stop 73 with which the air vane portion 60 of the latch member 50 makes contact, and a wall baffle portion 74, extending from the main portion. The wall baffle portion 74 is positioned such that when the actuator assembly 34 is positioned at the outer diameter, or proximate to the peripheral edge 22, of the data storage disk 20, the wall baffle portion 74 prevents low pressure air leakage.

As illustrated in FIGS. 1a, 1b and 2a, the stop 70 is a separate piece disposed positioned apart from the latch member 50. However, those skilled in the art will recognize that the stop 70 could be realized as a member attached directly to the latch member 50 for limiting rotation of the latch member 50 to prevent the air vane portion 60 from crashing into the rotating disk 20. Additionally, in the embodiment shown, the stop 70 is formed or molded as an integral extension of the actuator crash stop 37. However, the stop 70 could be realized as a separate member from the actuator crash stop 37.

To further understand the invention, operation of the latching mechanism 40 will now be discussed with reference to FIGS. 1a and 2b. Prior to the disk drive 10 being powered up, the transducer assembly 32 is parked in the landing zone 27 on the data storage disk 20, and the transducer actuator assembly 30 is latched in a locked state by the latching tooth 35 being trapped in the notched indentation 66 of the latching trap 62 of the latch member 50, which is in its undetected locked position, as shown in FIG. 1a. When power is applied to the spindle motor 24 of the disk drive 10, the data storage disk 20 is rotated in a counterclockwise direction as indicated by arrow A. As the rotating disk 20 reaches its optimum velocity of, for example, 6000 RPM, airflow is generated proximate to the surface of the disk 20 in a circular motion following the disk 20 rotation. However, the carriage arm 34 and transducer assembly 32 of the transducer actuator assembly 30 blocks the airflow from following its rotational path, thus creating a low pressure area 80 "downstream". The blocking effect of the actuator assembly 30 also diverts the airflow around a rear portion of the transducer actuator assembly 30, along a path defined by the sidewalls 16 of the housing 12 and into contact with the air vane portion 60 of the latch member 50, as indicated by the small directional arrows in FIG. 1a. This obstruction of the generated airflow by the carriage arm 34 of the transducer actuator assembly 30 creates the area of low pressure 80 just downstream of the carriage arm 34, and an area of high pressure 85 in the corner of the housing 12 containing the bulkhead connector 38 for the disk drive device 10. Thus, anytime the fluid stream of airflow is blocked by an obstruction, a low pressure zone or area is created downstream of the obstruction.

When the latch member 50 is in the locked position, as shown in FIG. 1a and detailed in FIG. 1b, the air vane portion 60 is disposed between the areas of low 80 and high pressure 85 such that the pressure difference integrated over the surface of the air vane portion 60 will generate a force, which will overcome the bias mechanism 55 of the latch member 50 and create a torque which will rotate the latch member 50 about the shaft 42 to its unlocked position, in the direction indicated by arrow C. The rotation of the latch member 50 causes the latching trap 62 to release the latching tooth 35 of the transducer actuator assembly 30 from the notched indentation 66 (FIG. 2b), allowing the transducer actuator assembly 30 bidirectional rotation as indicated by arrow B in FIG. 2a. This enables positioning of the transducer assembly 32 over various concentric data tracks on the surface of the disk 20.

When the disk drive device 10 is powered down, back EMF energy from the spindle motor 24 is conventially applied to the voice coil motor 36 of the transducer actuator assembly 30 to return the transducer assembly 32 to the landing zone 27 of the disk 20. Once the disk 20 reaches some low angular velocity, the pressure difference from the diverted airflow fails to generate a force sufficient to overcome the bias mechanism 55, and the latch member 50 will rotate back to its locked position, re-engaging the latching tooth 35 of the transducer actuator assembly 30 in the latching trap 62 and thus securing the transducer actuator assembly 30 in the locked state.

The latching mechanism 40 of the present invention provides several advantages over the prior art latching mechanisms. First, there is no need for extraneous electronic controls because the latching mechanism 40 is based on airflow principles which inherently exist within the disk drive device 10. This leads to a second advantage of reduced power consumption over prior art vanes which do require such controls. A further advantage is that a disk drive device 10 employing the latching mechanism 40 of the present invention can be assembled in an easier and more cost efficient manner since there is no vane-to-disk merge operation. A still further advantage is that when the latching apparatus 40 of the present invention is employed in a disk drive device 10 containing multiple stacked disks 20, the number of disk surfaces in the disk drive device 10 can be increased without significantly increasing the height of the disk drive device 10, since the air vane structure is not disposed between the disks 20, eliminating the need for extra spacing between the disks 20. Thus, the present invention can provide an easy to assemble, reduced power, cost efficient disk drive device 10.

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

What is claimed is:

1. A pressure differential latch apparatus for a disk drive assembly contained in a housing including a base with integral sidewalls defining an interior space, the disk drive assembly including at least one rotatable data storage disk having a surface for storing data and a transducer actuator assembly, disposed over the surface of the data storage disk, having a transducer assembly for accessing data on the data storage disk and an actuator motor for positioning the transducer assembly relative to concentric data track locations on the data storage disk and to and from a head parking position on the data storage disk, the latch apparatus comprising:

a fixed shaft attached to the base of the housing proximate to a sidewall of the housing and at a predetermined distance from an edge of the data storage disk;

a rigid air vane member including a hollow body rotatably disposed on the shaft and an air vane portion extending radially from the hollow body in a space between the edge of the data storage disk and the sidewall of the housing, the air vane portion having a surface area disposed between an area of low pressure and high pressure, the area of low pressure and high pressure resulting from airflow, generated by rotation of the data storage disk, being blocked by the transducer actuator assembly; and a latching trap extending from the hollow body of the air vane member in a direction opposite of the air vane portion, the latching trap for releasably engaging a latching tooth on the transducer actuator assembly to latch the transducer actuator assembly and maintain the transducer assembly at the head parking position when the disk is not being rotated, wherein a pressure differential, caused by the airflow blockage, acts upon the surface area of the air vane portion to create a force at a distance for rotating the vane member to an unlocked position thereby causing the latching trap to release the transducer actuator assembly, and wherein in an absence of the airflow, the air vane member is biased to rotate the vane portion to a locked position thereby causing the latching trap to engage the transducer actuator assembly wherein the air vane member moves only within the space between the edge of the data storage disk and the sidewall of the housing during the process of engaging and releasing the transducer actuator assembly.

2. The pressure differential latch apparatus of claim 1 further comprising a spring bias for retaining the air vane member in the locked position in the absence of the airflow.

3. The pressure differential latch apparatus of claim 1, wherein the air vane portion and the latching trap are integral extensions of the hollow body.

4. The pressure differential latch apparatus of claim 1 further comprising a stop fixedly attached to the base in a space between the edge of the data storage disk and the air vane member, the stop for preventing the air vane member from rotating into contact with the data storage disk.

5. A latch apparatus for a disk drive assembly contained in a housing including a base with integral sidewalls defining an interior space, the disk drive assembly including at least one rotatable data storage disk having a surface for storing data and a transducer actuator assembly, disposed over the surface of the data storage disk, having a transducer assembly for accessing data on the data storage disk and an actuator motor for positioning the transducer assembly relative to concentric data track locations on the data storage disk and to and from a head parking position on the data storage disk, the latch apparatus comprising:

a shaft attached to the base a predetermined distance from a peripheral edge of the data storage disk proximate to a sidewall of the housing; and a latch member rotatably disposed on the shaft, the latch member including:

a body portion rotatable about the shaft, a rigid vane portion movably disposed in a space between the peripheral edge of the data storage disk and the sidewall of the housing proximate to said sidewall, the vane portion having a surface with a first end fixedly attached to the body portion, and a second end extending radially from the body portion to within a predetermined distance from one of the sidewalls, the vane portion having a locked position and an unlocked position, and a latching trap for engaging the transducer actuator assembly in a locked state when the transducer assembly is located at the head parking position whenever the data storage disk is not being rotated, and for releasing the transducer actuator assembly from the locked state when the data storage disk is rotated, wherein rotation of the data storage disk generates airflow, proximate to the surface of the disk, which is blocked by the transducer actuator assembly, the blocked airflow creating a pressure differential which acts upon the surface of the vane portion to rotate the latch member counter clockwise to the unlocked position thereby causing the latching trap to release the transducer actuator assembly from the locked state, and wherein in an absence of the airflow, the shaft is biased to rotate the latch member to the locked position thereby causing the latching trap to engage the transducer actuator assembly wherein the rigid vane portion moves only within the space between the peripheral edge of the data storage disk and said sidewall of the housing during the process of engaging and releasing the transducer actuator assembly.

6. The latch apparatus of claim 5, wherein the shaft further comprises a spring bias for retaining the air vane portion in the locked position in the absence of the airflow.

7. The latch apparatus of claim 6 further comprising a stop fixedly attached to the base in a space between the peripheral edge of the data storage disk and the air vane portion, the stop for preventing the air vane portion from rotating into contact with the data storage disk.

8. A latch apparatus for a disk drive assembly contained in a housing including a base with integral sidewalls defining an interior space, the disk drive assembly including at least one rotatable data storage disk having a surface for storing data and a transducer actuator assembly, disposed over the surface of the data storage disk, having a transducer assembly for accessing data on the data storage disk and an actuator motor for positioning the transducer assembly relative to concentric data track locations on the data storage disk and to and from a head parking position on the data storage disk, the latch apparatus comprising:

a shaft attached to the base a predetermined distance from a peripheral edge of the data storage disk and proximate to a sidewall of the housing;

a latch member rotatably disposed on the shaft, the latch member including:

a body portion rotatable about the shaft, a rigid vane portion movably disposed in a space between the peripheral edge of the data storage disk and the sidewall of the housing, the vane portion having a surface with a first end fixedly attached to the body portion, and a second end extending radially from the body portion to within a predetermined distance from said sidewalls of the housing, the vane portion having a locked position and an unlocked position, and a latching trap for engaging the transducer actuator assembly in a locked state when the transducer assembly is located at the head parking position whenever the data storage disk is not being rotated, and for releasing the transducer actuator assembly from the locked state when the data storage disk is rotated; and a stop fixedly attached to the base in a space between the peripheral edge of the data storage disk and the air vane portion, the stop comprises a main body and a wall baffle extending from the main body, wherein the latch member comes in contact with a point on the main body of the stop to prevent the air vane portion of the latch member from rotating into contact with the data storage disk, and the wall baffle is positioned such that the wall baffle blocks airflow generated at the edge of the data storage disk thereby creating a low pressure area when the transducer actuator assembly is positioned proximate the edge of the data storage disk wherein rotation of the data storage disk generates airflow, proximate to the surface of the disk, which is blocked by the transducer actuator assembly, the blocked airflow creating a pressure differential which acts upon the surface of the vane portion, rotating the latch member to the unlocked position thereby causing the latching trap to release the transducer actuator assembly from the locked state, and wherein in an absence of the airflow, the shaft is spring biased to rotate the latch member to the locked position thereby causing the latching trap to engage the transducer actuator assembly wherein the rigid vane portion moves only within the space between the edge of the data storage disk and said sidewall of the housing during the process of engaging and releasing the transducer actuator assembly.

9. The latch apparatus of claim 5, wherein the second end of the rigid air vane portion extends to within about 0.2 to about 0.7 mm from one of the sidewalls of the housing.

10. The latch apparatus of claim 5, wherein the rigid air vane portion and the latching trap are integral extensions of the body portion.

11. The latch apparatus of claim 5, wherein the body portion of the latch member comprises a forward section having a hollow cylindrical core in which the shaft is disposed, and a rear section from which the latching trap extends.

12. The latch apparatus of claim 5, wherein the latch member is formed of polymerized plastic resin.

13. A method for unlatching and releasably latching a transducer actuator assembly of a rotatable disk drive device contained in a housing in order to maintain a transducer assembly at a landing zone on a surface of a data storage disk when the data storage disk is not rotating, the method comprising the steps of:

positioning a latch member a predetermined distance from an edge of the data storage disk, the latch member including a body portion rotatably attached to the housing, a rigid air vane portion having a planar surface which is disposed orthogonal to the surface of the data storage disk proximate to a sidewall of the housing, and a trapping latch releasably engaging the transducer actuator assembly to maintain the transducer assembly at the landing zone, the latch member positioned to rotate without contacting the data storage disk in a space between the peripheral edge of said storage disk and said sidewall of the housing;

generating airflow proximate the surface of the data storage disk by rotation of the data storage disk;

blocking airflow over a portion of the surface of the disk upstream from the latch member thereby creating a low pressure area upstream from the air vane portion, a high pressure area in a space between the air vane portion and sidewalls of the housing, and a resulting pressure differential force;

rotating, by the pressure differential force, the rigid air vane portion counter clockwise toward the edge of the rotating disk;

releasing the transducer actuator assembly from the latching trap upon rotation of the rigid air vane portion toward the edge of the rotating disk wherein the air vane portion moves only within the space between the peripheral edge of the data storage disk and said sidewall of the housing during the process of engaging and releasing the transducer actuator assembly.

14. The method of claim 13 further comprising steps of:

ceasing rotation of the data storage disk, causing cessation of the airflow and thereby removing the pressure differential force;

biasing the latch member to rotate the rigid air vane portion away from the edge of the disk; and re-engaging the transducer actuator assembly with the trapping latch, wherein the transducer assembly is repositioned at the landing zone when the data storage disk is no longer rotated.

* * * * *